United States Patent [19]
Smith et al.

[11] Patent Number: 6,015,493
[45] Date of Patent: Jan. 18, 2000

[54] MULTIPLE FILTRATION BYPASS METHOD AND APPARATUS FOR REDUCING PARTICLES IN LIQUID DISTRIBUTION SYSTEMS

[75] Inventors: Kenneth Smith, Cupertino; Brent Krick, Mountain View; Alejandro Garcia, Union City, all of Calif.

[73] Assignee: Teleparts International, Inc., Fremont, Calif.

[21] Appl. No.: 08/893,602

[22] Filed: Jul. 14, 1997

[51] Int. Cl.$^7$ .................................................. B01D 35/00
[52] U.S. Cl. ............................................ 210/252; 210/900
[58] Field of Search ................................... 210/900, 194, 210/196, 252, 253, 254, 258, 323.1, 435, 433.1

[56] References Cited

U.S. PATENT DOCUMENTS

| | | | |
|---|---|---|---|
| 4,917,123 | 4/1990 | McConnell et al. | 134/95 |
| 5,073,268 | 12/1991 | Saito et al. | 210/638 |
| 5,160,429 | 11/1992 | Ohmi et al. | 210/137 |
| 5,190,065 | 3/1993 | Kovac et al. | 134/107 |
| 5,512,178 | 4/1996 | Dempo | 210/900 |
| 5,542,441 | 8/1996 | Mohindra et al. | 134/95.2 |
| 5,571,337 | 11/1996 | Mohindra et al. | 134/25.4 |

OTHER PUBLICATIONS

Clean Water for Critical Processes, "*Ultrafiltration System*", S&K Products International, Inc., 9 pages, copyright 1990.
Pall Corp., "*Chemical Filtration*", 1988–89, pp. 18–20, 26, 150–154.

Millipore Corporation, "*Chemical Products Chemical Compatibility Guide*", pp. 50–51, 54, 96–97.
"The Behavior of Particles in Liquid Chemicals and Their Deposition Control onto Silicon Wafer Surfaces," T. Kezuka, M. Ishii, T. Hosomi, M. Suyama, S, Maruyama, M. Itano and M. Kubo, Daikin Industries, Ltd., Jul. 1992, pp. 84–97.
"Influence of Metallic Impurities on SC–1 Cleaning", Y. Sugihara, S. Shimokawa, Y. Oshida, Mitsubishi Gas Chemical Company, Inc., Tokyo, Japan, pp. 170–184.
"The Segregation and Removal of Metallic and Organic Impurities from the Interface of Silicon and Liquid Chemicals", Takashi Imaoka, Takehiko Kezuka, Jun Takano, Hisayuki Shimada andf Tadahiro Ohmi, Department of Electronics, Faculty of Engineering, Tohoku University, pp. 127–155.

*Primary Examiner*—Robert J. Popovics
*Attorney, Agent, or Firm*—Limbach & Limbach L.L.P.

[57] ABSTRACT

A remote filtration unit for liquid distribution systems (LDS) used for delivering ultra-pure liquids for semiconductor manufacturing processes is provided. The filtration unit includes a plurality of filtration systems enclosed in separate compartments, wherein each compartment is served by an input and an output lead line. Using quick connect/disconnect fittings, the liquid distribution system (LDS) channel is tapped at desired locations and bypass loops are inserted in the channel. A bypass loop includes an input lead line, an associated filtration unit compartment including a filtration system, and an output lead line. Using bypass loops, LDS liquid is routed into the remote filtration system, cleaned, and then channeled back into the liquid distribution system or target product or process area.

18 Claims, 5 Drawing Sheets

MULTIPLE FILTRATION BYPASS METHOD AND APPARATUS FOR REDUCING PARTICLES IN LIQUID DISTRIBUTION SYSTEMS

FIELD OF THE INVENTION

The present invention relates to processes and systems for reducing or eliminating particle matter from a liquid medium used in equipment including liquid distribution systems and process applications. More particularly, the present invention relates to reducing particle counts in liquid used for cleaning, processing, and rinsing substrate material under micro-contamination control conditions.

BACKGROUND OF THE INVENTION

Filtration is an important step in the delivery of high purity liquids for manufacturing. The purity of acids, process chemicals, and other liquids used in semiconductor manufacturing is becoming more critical with the increasing trend towards higher device densities. Specifically, in ultra large scale integration (ULSI) manufacturing, it is crucial to make the surface of silicon wafers as clean as possible in order to realize the decreased device dimensions and increased performance and reliability of currently available technologies. Existing liquid distribution systems (LDS) used to distribute ultra-pure liquid to processing equipment for such cleaning processes are susceptible to a variety of particle contaminants. In particular, incoming liquid can damage critical components. In addition, liquid distribution systems themselves can be a potential source of particle debris.

FIG. 1 is a block diagram that depicts a simple example of a prior art processing system 10. The example processing system 10 includes a liquid distribution system 20 and a target product or process area 30. The liquid distribution system 20 includes a single array of various high precision components such as pressure regulators 22, flow control valves 24, flow meters 26 and check valves 28. It should be understood that typical systems can include several such component arrays, each forming a different liquid distribution channel. The example processing system 10 is shown without any type of filtration system, neither upstream or downstream of the liquid distribution system 20. Such a configuration will pass particles within the liquid onto the target process area 30 and potentially contaminate the components 22, 24, 26, 28 of the LDS 20.

Turning to FIG. 2, prior art systems teach that the ideal position for a filtration system 40 is as near to the final destination of the liquid as possible. This technique, termed "point-of-use" filtration, provides the cleanest possible liquid to the target process area 30. In this example pictured, the target process area 30 is the final destination of the liquid. Essentially, the output of the liquid distribution system 20 feeds the input of a post-filtration system 40, which then passes the liquid to the target 30. The region after the post-filtration system 40, but before the next point in which contaminants may be introduced into the liquid, in this case the target process area 30, is referred to as the filter zone 50. The chance of any impurities being introduced into the filtered liquid, before reaching the target 30, is minimized because the filter zone 50 immediately proceeds the target process area 30.

However, point-of-use filtration used alone, after a LDS 20 with in-line components 22, 24, 26, 28 has a significant drawback. Such a post-filtration system 40 leaves the components 22, 24, 26, 28 of the liquid distribution system 20 exposed and vulnerable to possible permanent damage by incoming contaminated liquid. It is not uncommon that the liquid entering an LDS 20 will contain colloidal silica, pyroxenes, bacteria, pyrogens (bacteria fragments), particulate debris, resin beads, and total organic carbon (TOC) that could permanently impair the precision LDS components 22, 24, 26, 28.

An inadequate prior art solution to the problem of contaminated incoming liquid damaging LDS components 22, 24, 26, 28 is to use a pre-filtration system 60 before the liquid distribution system 20 as shown in FIG. 3, instead of the post-filtration system 40 configuration of FIG. 2. Conventional liquid distribution systems 20 are normally filtered prior to the inlet port as shown in FIG. 3. The distance between the filter and the final output port is dependent on the number of LDS components 22, 24, 26, 28 the length of interconnecting tubing, and the liquid distribution design. In the example configuration pictured, the filter zone 70 extends from the filter to the beginning of the LDS 20.

As indicated above, although a pre-filtration system 60 positioned before an array of sensitive liquid distribution components 22, 24, 26, 28 will capture incoming particles and protect the components 22, 24, 26, 28 particles detrimental to the target process or product 30 can potentially release from the LDS 20 itself. In other words, this solution is inadequate because components 22, 24, 26, 28 that are positioned after the outlet port of the pre-filtration system 60 can shed detrimental particles due to mechanical fatigue, material deterioration, and friction. As a general rule, the greater the distance between the filter and final destination of process liquid, the probability for additional particle contamination increases exponentially.

Such detrimental particles can come from moving parts within the wetted area or inner portions of the liquid passages including valve seats, fittings, springs, o-ring seals, and diaphragm seals of the LDS components 22, 24, 26, 28 that fatigue over time and/or during mechanical operation. The release of particle matter becomes more of a problem after thousands of cycles or hours of operational use. As the system ages with use, the deterioration of the internal cavities of the component bodies, rubber seals, gaskets, and metal fittings comprise the majority of the detrimental particles released by the LDS 20. What is needed is a filtration system that will both protect the LDS components and retain the detrimental particles released by the LDS.

To summarize, the critical disadvantages of the prior art configurations depicted in FIGS. 2 and 3 are twofold. If incoming liquid is plagued with particle debris, components downstream of the liquid flow path can be permanently damaged or contaminated. If a filtration system is positioned upstream of the components, incoming liquid plagued with particle debris would be captured by the filter, however; the components still remain a source of particle generation.

A simple solution would be to use both a pre-filtration system 60 and a post-filtration system 40 simultaneously as depicted in FIG. 4. This configuration provides "before and after" filtration and protection. A pre-filtration system 60 is positioned upstream of a given array of LDS components 22, 24, 26, 28 in front of the input port of the liquid distribution system. A secondary, post-filtration system 40 is positioned downstream of the last component 28 of the LDS 20, connected at the output port of the last component 28 and as close to the target product or process area 30 as possible. The pre-filtration system 60 is used to capture gross particles prior to liquid entering the distribution system 20. The secondary filtration system 40 captures any particles released from the components during cycling (i.e. on-off) use or as a result of aging.

Still referring to the configuration of FIG. 4, the distance between the secondary filtration system 40 and the terminal destination of the output liquid, the target process area 30, is minimized. As indicated above, the position of the post-filtration system 40 relative to the liquid distribution system 20 is critical. Such point-of-use filtration provides the cleanest possible liquid by positioning the filtration system 40 as close as possible to the target product or process area 30.

While such a configuration does provide the benefits of "before and after" filtration and protection, the in-line filtration solution of FIG. 4 also includes a number of drawbacks that have rendered it commercially impractical, particularly where an existing LDS needs to be retrofitted with extra filtration systems. The use of two filtration systems in line with a LDS component array increases the total length of the LDS. In particular, when the LDS includes several distribution channels and components, the total length required increases substantially. In addition, the maintenance requirement of an LDS is significantly increased with the use of both pre-filtration and post-filtration. As with space requirements, the maintenance requirements increase proportionately with the number of liquid distribution channels, routes, and flow directions. In more complex systems, it can become difficult to perform maintenance on the filtration systems because it becomes difficult to access the various different filtration systems located at both ends of each distribution channel.

Additionally inexpensive and currently commercially available filtration systems do not have retention shut-off check valves. This means that residual liquid in the distribution system 20 will likely leak out of the line during filter maintenance. Liquid spills in the equipment chassis of the distribution system can be hazardous to an operator and eventually induce rust, corrosion, and contamination inside the liquid passages of the LDS. Clearly, this problem is aggravated by increasing the number of filtration systems within the LDS 20. Further, the potential for loose connectors and fittings increases as more filters are added to the system. This also increases the chances of the LDS releasing more detrimental particles into the liquid after each filter maintenance cycle.

Thus, for non-trivial liquid distribution systems that include several component arrays, it is impractical to insert in-line filtration systems before and after each component array. What is needed then, is a liquid distribution system in which the benefits of both point-of-use and before-and-after filtration are realized without the increased length and maintenance requirements of inserting a discrete filtration system (in-line with the main liquid channel) both upstream and downstream of each component array. What is further needed is a means for maintaining such a system without allowing liquid spills or an increased chance of contaminating the system. What is also needed is a means to easily add before-and-after filtration to existing liquid distribution systems that are lacking either a pre- or post-filtration system.

It is an object of the present invention to provide a liquid distribution system with the benefits of both point-of-use and before-and-after filtration and without increased space and maintenance requirements.

It is a further object of the present invention to provide a liquid particle reduction filtration system for existing liquid distribution systems.

It is a further object of the present invention to provide a point-of-use filtration system that can be easily adapted for use with existing liquid distribution systems requiring only a minimal degree of alteration of the existing system.

It is a further object of the invention to provide a filtration system that requires no maintenance other than scheduled replacement over a specific period of time.

It is a further object of the present invention to minimize footprint and space requirements when integrating the filtration system of the present invention into existing liquid distribution systems.

It is a further object of the present invention to provide an easy to install before-and-after filtration system for existing liquid distribution systems that improves the ease of maintenance and does not add complications or potential contaminants to the system.

SUMMARY OF THE INVENTION

The above and other objects of the invention are achieved by the present invention of a liquid distribution system (LDS) including a multiple filtration bypass system. The multiple filtration bypass system includes a remote filtration unit including a plurality of filtration systems, each filtration system having an input and an output lead line. Using quick connect/disconnect fittings, the liquid channel (through which liquid flows through the LDS) is severed at the desired locations and bypass loops are inserted in the channel. A bypass loop includes an input lead line, a portion of the remote filtration unit including a filtration system, and an output lead line. Using bypass loops, LDS liquid is thus re-routed into the remote filtration systems, cleaned, and then channeled back into the liquid distribution system or target product or process area.

The bypass feature of the present invention allows a user to conveniently upgrade an existing filtration system without directly altering the integrity of the is existing liquid distribution system. Equally importantly, the ability to tap into the LDS at any desired or convenient point allows the LDS to incorporate point-of-use and before-and-after filtration methodologies without the drawbacks identified in the background section above.

In applications where equipment space and access are limited, the present invention allows filtration to take place outside of a pre-existing equipment chassises that typically house component arrays. In other words, the filtration systems of the present invention are remote from the LDS to allow space minimization and flexibility. Maintenance is limited to simply replacing the entire remote filtration unit, or just a compartment of the remote filtration unit, at regular intervals based on use, once the included filtration systems have become full of extracted particles. The remote filtration unit can be configured to allow access to the filtration systems or it can be a sealed unit. In addition, the remote filtration unit can be a single sealed container that includes separate sealed compartments for the filtration systems or it can be made up of several modular compartments. Also, the chance of liquid spills within the equipment chassis or at all, are reduced due to the use of quick connect/disconnect fittings that are operated outside and away from the LDS.

The present invention simultaneously guards component arrays of liquid processing components from possible incoming debris as well as protects the end product from coming in contact with contaminated liquid. Further, the present invention enables an existing liquid distribution system to retain potential particle matter by positioning a primary filter before the inlet port of a given component array and a secondary filter after the component array outlet port. Thus, any particles released from the component are immediately captured by the secondary filter. In other words, the present invention provides reduction of contamination in liquids in lieu of particle "shedding" components from a given liquid distribution system.

The filtration unit of the present invention minimize space requirements, installation time, replacement time, and in particular, the amount of alteration required of existing liquid distribution systems to upgrade the filtration system. Down time for maintenance is minimized because all the filtration systems of a LDS can be replaced at once by merely swapping out the entire filtration unit of the present invention. The procedure merely involves disconnecting and reconnecting quick connect/disconnect fittings. With the present invention it is no longer necessary to access several in-line filtration systems within the chassis of the LDS.

The present invention can be an enclosed and independent unit. The filtration unit can include filtration systems that are self-contained and disposable after use. The filtration unit can be sold as a pre-configured system package. This means that the filter mediums used in the various filtration systems of the filtration unit can be pre-selected to serve specific functions such as trapping a particular contaminant or allowing a certain flow rate. Thus, the prior art requirement that individual filters be separately replaced during scheduled maintenance periods is eliminated. The maintenance operator no longer needs to locate each filter and replace each one with the correct type of replacement filter.

The present invention prevents a maintenance operator from forgetting to replace one of several filters and it prevents the maintenance operator from placing the wrong type of filter in a particular filter location. The present invention simplifies the task of maintenance by allowing all filtration systems to be replaced at once. In other words, the entire filtration unit of the LDS can be replaced with a new unit. Only input and output bypass lines need to be disconnected from the old unit and reconnected to the replacement unit.

These and other features and advantages of the present invention will be understood upon consideration of the following detailed description of the invention and the accompanying drawings.

DETAILED DESCRIPTION OF THE PREFERRED EMBODIMENTS

Figure 1:
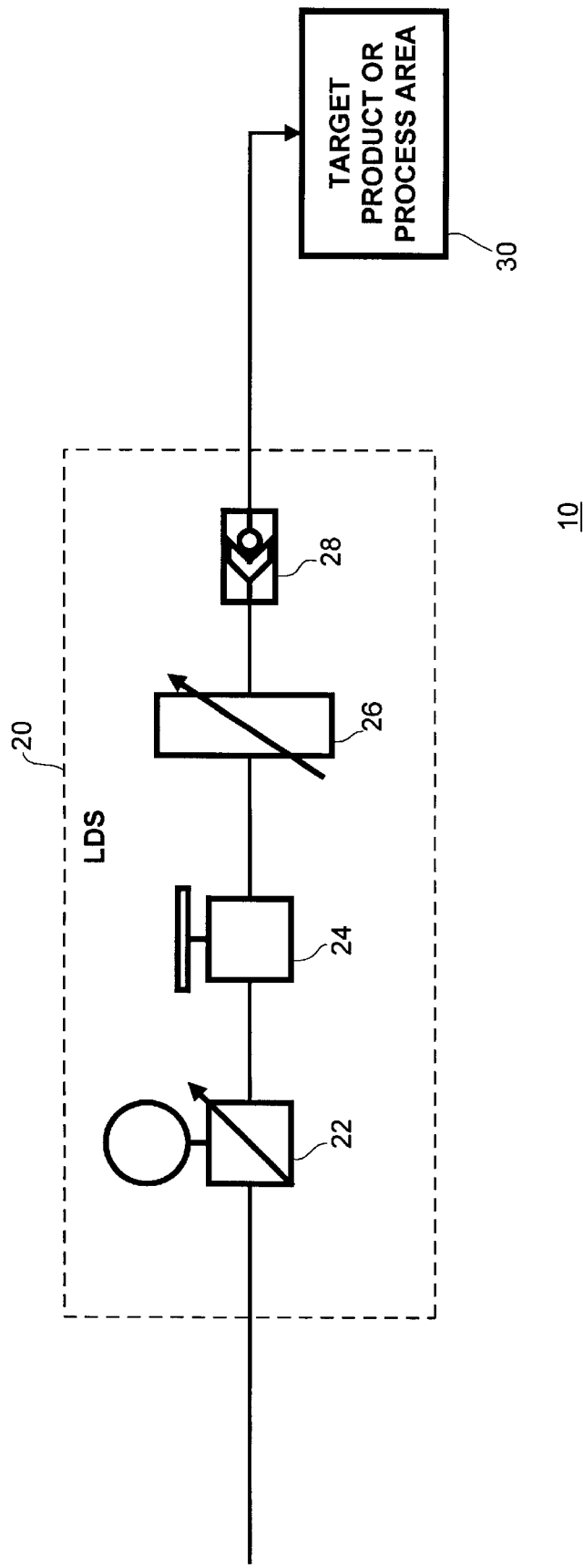
FIG. 1 is a block diagram depicting a prior art liquid processing system including a liquid distribution system.
Figure 2:
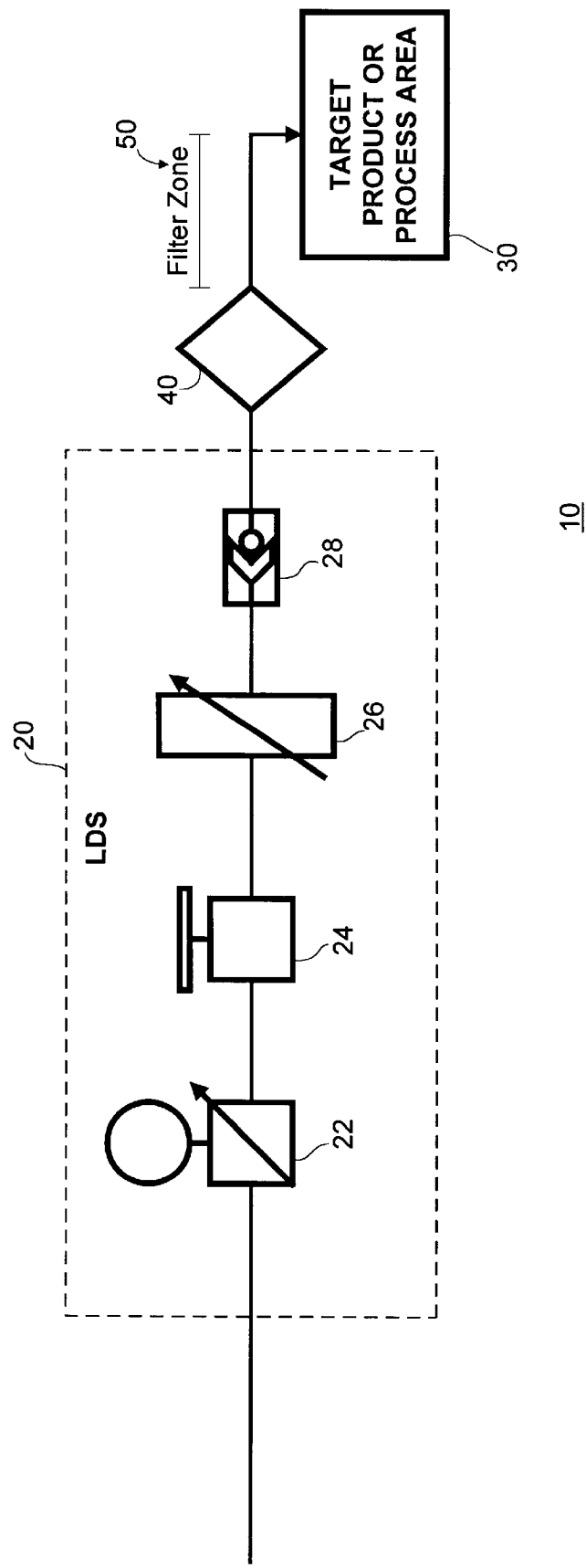
FIG. 2 is a block diagram depicting a prior art liquid processing system including a liquid distribution system with a post-filtration system.
Figure 3:
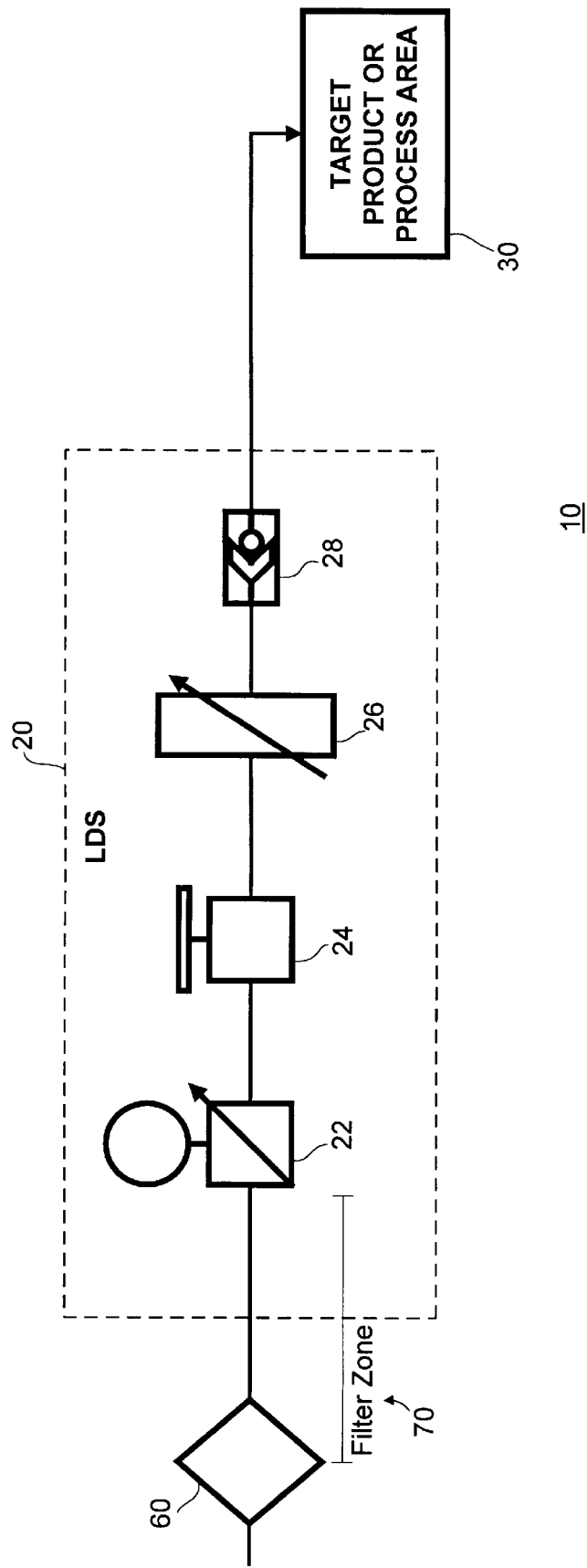
FIG. 3 is a block diagram depicting a prior art liquid processing system including a liquid distribution system with a pre-filtration system.
Figure 4:
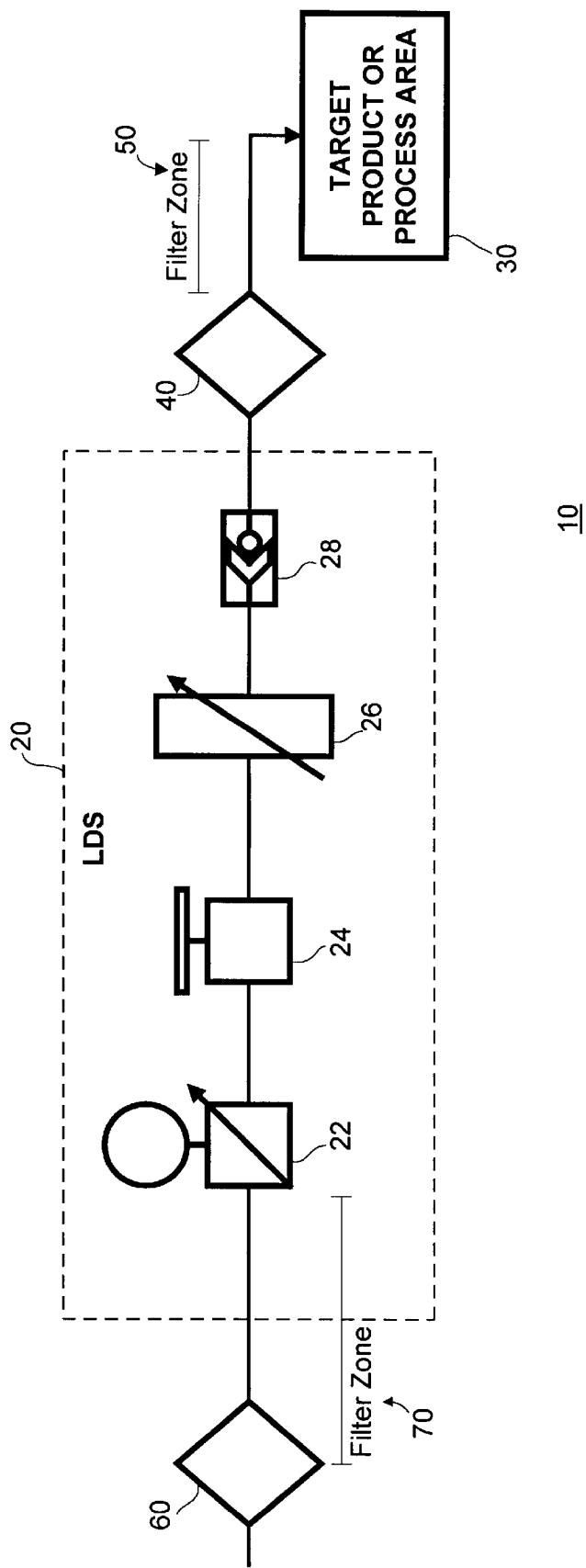
FIG. 4 is a block diagram depicting a liquid processing system including a liquid distribution system with a pre-filtration system and a post-filtration system.
Figure 5:
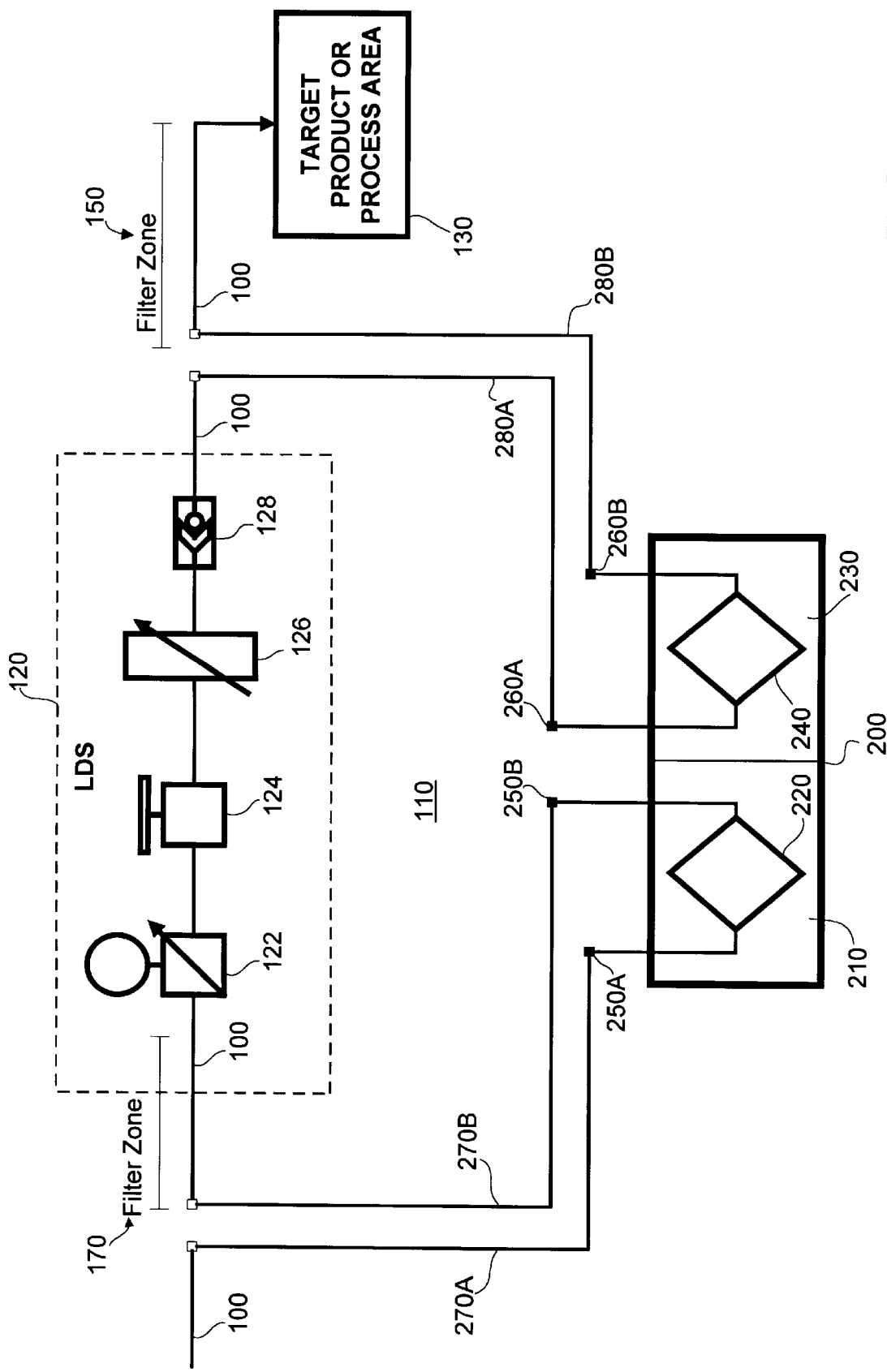
FIG. 5 is a block diagram depicting a liquid processing system including a liquid distribution system with a multiple bypass filtration system according to the present invention.

The multiple filtration bypass system and method of the present invention is shown as part of an example liquid cleaning process system 110 in FIG. 5. The process system 110 includes a liquid distribution channel 100 through a liquid distribution system (LDS) 120, a target product or process area 130, and a multiple bypass filtration unit 200. The liquid distribution system 120 includes the liquid distribution channel 100 that allows liquid communication through an array of various high precision components such as pressure regulators 122, flow control valves 124, flow meters 126 and check valves 128. It should be understood that liquid distribution systems 120 can include several such component arrays, each forming a different liquid distribution channel 100. It should also be understood that distribution channels 100 are typically linear but can follow any path connecting the devices 122, 124, 126, 128 in the component array. The multiple bypass filtration unit 200 includes a plurality of filtration systems 220, 240. The multiple bypass filtration unit 200 can also include a plurality of filter compartments 210, 230 for housing the filtration systems 220, 240. The compartments 210, 230 can be sealed and they can be modular such that they can be individually replaced or linked together to form the filtration unit 200.

Although the multiple bypass filtration unit 200 embodiment depicted in FIG. 5 only includes two filtration systems 220, 240, it should be understood that the present invention can include any number of filtration systems 220, 240. The filtration systems 220, 240 themselves can be simple membrane filters such as the commercially available models known as Chem-Line, Fluorogard, Wafergard, Microgard, Durapore, and Polygard filters manufactured by Millipore Corporation of Bedford, Mass. or electrically charged filters manufactured by Pall Corporation of East Hills, N.Y., such as the Posidyne, Ultipore, and/or Ultipleat Posidyne filter models. Alternatively, the filtration systems can be (or include) more complex filtration systems such as the commercially available U.F.S. 05, 10, 20 models manufactured by S&K Products International Incorporated of Chestnut Ridge, N.Y. Further, the filtration used in the present invention (e.g., systems 220, 240) can include sets of filters in many different configurations such as parallel networks or series arrays. For example, each of the filtration systems used in the bypass filtration unit of the present invention can include any commercially available filter bank (including positively charged filter mediums in series with negatively charged or neutrally charged filter mediums) to implement filtration.

Returning to FIG. 5, the input and output lines of the filtration systems 220, 240 of the bypass filtration unit 200 are connectable to the input and output lines of the LDS 120 by means of quick connect/disconnect fittings 250A, 250B, 260A, 260B. These quick connect/disconnect fittings 250A, 250B, 260A, 260B can be for example SU4FN-1 models which are commercially available from Fluoroware Corporation of Chaska, Minn.

When a bypass filtration unit 200 is installed in a process system 10, the liquid distribution channel 100 is severed at the input to the LDS and as close to the target product or process area 130 as possible. A pair of lead lines 270A, 270B, 280A, 280B extending to the bypass filtration unit 200 are permanently connected to the liquid distribution channel 100 at each of the severed points. The pairs of lead lines are connected to the input and output lines of the filtration systems 220, 240 with the quick connect/disconnect fittings 250A, 250B, 260A, 260B as described above.

For each pair of lead lines 270A, 270B, 280A, 280B, one lead line 270A of the pair carries contaminated liquid from the liquid distribution channel 100 to the bypass filtration unit 200 while the other lead line 270B carries clean liquid from the bypass filtration unit 200 back to the liquid distribution channel 100. Thus, a bypass filtration circuit is formed by the lead line 270A from the liquid distribution channel 100, through the quick connect fitting 250A, through the input line of the first filtration system 220 of the filtration unit 200, through the filtration system 220 itself, through the output line of the filtration system 220, through the quick connect fitting 250B, and back through the return lead line 270B to the liquid distribution channel 100.

The present invention provides an array of filtration systems 220, 240 that is part of a bypass circuit which can be inserted into the liquid distribution channel 100 of any of a variety of process systems 110. This modularity and flexibility provides ease of installation and maintenance, as well as reduced space requirements. The present invention creates filter zones 170 and 150 in the desired locations to achieve both before-and-after filtration and point-of-use filtration.

The filtration systems 220, 240 can serve different functions depending upon where in the length of the liquid distribution channel 100 their associated bypass circuit is located. For example, the bypass circuit of the second filtration system 240 primarily serves to trap particles shed from the LDS components 122, 124, 126, 128. This filtration system acts as a secondary filter to the first filtration system 220. The bypass circuit of the first filtration system 220 primarily serves to trap particles found in the liquid first entering the LDS. This first filtration system 220 also serves to protect the LDS components 122, 124, 126, 128 from any detrimental particles that might otherwise cause permanent damage.

The type of filtration system 220, 240 used in the various compartments 210, 230 of the bypass filtration unit 200 will depend upon the function of the bypass circuit. In other words, in the present example embodiment, the first filtration system 220 might be selected to provide a high flow rate, a low pressure drop, and optimally trap resin that would ruin the LDS components 122, 124, 126, 128, while the second filtration system 240 might be selected to optimally trap component fragments that are shed by the various LDS components 122, 124, 126, 128. Many other configurations are possible. In particular, a primary filtration system can filter incoming liquid while a number of secondary filtration systems can be located downstream of several parallel liquid distribution channels that are all fed by the output of the primary filtration system. In another embodiment, the filtration medium of the primary filtration system can be electrically charged while the filter medium of the secondary filtration system can be oppositely electrically charged.

Various other modifications and alterations in the structure and method of operation of this invention will be apparent to those skilled in the art without departing from the scope and spirit of the invention. In particular, the invention can be used to support much more complex liquid distribution systems than the example one pictured. Additionally, other equivalent devices, including filters and fittings, can be substituted for those devices described above.

Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus for filtering liquid within a liquid distribution system having one or more components, a liquid channel through which liquid can flow into and out of each of the components, and an input channel which receives the liquid before said liquid flows into the liquid channel, wherein a first distance separates an input end of the liquid channel from an output end of the input channel, the apparatus comprising:

a plurality of filtration systems, each having an input port and an output port;

a plurality of channel diverting extensions from the liquid distribution system; and a plurality of channel return extensions to the liquid distribution system, wherein each of the channel diverting extensions is coupled between the liquid distribution system and a different one of the input ports of the filtration systems, with at least one of the channel diverting extensions having length greater than the first distance and being coupled between the output end of the input channel and the input end of the liquid channel, and wherein each of the channel return extensions is coupled between the liquid distribution system and a different one of the output ports of the filtration systems, with one of the channel return extensions having length greater than the first distance and being coupled between the output end of the input channel and the input end of the liquid channel, wherein at least one of the channel diverting extensions and the channel return extensions is detachably coupled to one of the filtration systems or to the liquid distribution system.

2. The apparatus of claim 1 wherein the channel diverting extensions and the channel return extensions are detachably coupled to the filtration systems.

3. The apparatus of claim 1 wherein one or more of the channel diverting extensions and one or more of the channel return extensions are coupled to the liquid distribution system upstream of the one or more components of the liquid distribution system and one or more of the channel diverting extensions and one or more of the channel return extensions are coupled to the liquid distribution system downstream of the one or more components of the liquid distribution system.

4. The apparatus of claim 3 wherein at least one of the filtration systems coupled to at least one of the channel diverting extensions coupled to the liquid distribution system downstream of the one or more components includes a filter medium suitable for trapping particles shed from the one or more components.

5. The apparatus of claim 3 wherein at least one of the filtration systems coupled to at least one of the channel diverting extensions coupled to the liquid distribution system upstream of the one or more components includes a filter medium having a first electrical charge and at least one of the filtration systems coupled to at least one of the channel diverting extensions coupled to the liquid distribution system downstream of the one or more components includes a filter medium having a second electrical charge.

6. The apparatus of claim 5, wherein one of the first electrical charge and the second electrical charge is positive and another one of the first electrical charge and the second electrical charge is negative.

7. The apparatus of claim 1 wherein the plurality of filtration systems are housed in a single container.

8. The apparatus of claim 1 wherein the plurality of filtration systems are housed in a plurality of modular containers.

9. The apparatus of claim 1 wherein said one or more components of the liquid distribution system are housed in a chassis, and each of the filtration systems is located outside said chassis so as to provide ease of access.

10. An apparatus for filtering liquid within a liquid distribution system having one or more components and a liquid channel that allows through which liquid can flow into and out of each of the components, and an input channel which receives the liquid before said liquid flows into the liquid channel, wherein a first distance separates an input end of the liquid channel from an output end of the input channel, the apparatus comprising:

a first filtration system having an input and output port;

a second filtration system having an input and an output port;

a first channel extension coupled between the input port of the first filtration system and the liquid distribution system, wherein the first channel extension has length greater than the first distance;

a second channel extension coupled between the input port of the second filtration system and the liquid distribution system;

a third channel extension coupled between the output port of the first filtration system and the liquid distribution system, wherein the third channel extension has length greater than the first distance; and a fourth channel extension coupled between the output port of the second filtration system and the liquid distribution system, wherein at least one of the first channel extension, the second channel extension, the third channel extension, and the fourth channel extension is detachably coupled to one of the first filtration system, the second filtration system, and the liquid distribution system.

11. The apparatus of claim 10 wherein the first channel extension, the second channel extension, the third channel extension, and the fourth channel extension are detachably coupled to the plurality of filtration systems.

12. The apparatus of claim 10 wherein the first channel extension and the third channel extension are coupled to the liquid distribution system upstream of the one or more components of the liquid distribution system and the second channel extension and the fourth channel extension are coupled to the liquid distribution system downstream of the one or more components of the liquid distribution system.

13. The apparatus of claim 10 wherein the second filtration system includes a filter medium suitable for trapping particles shed from the one or more components.

14. The apparatus of claim 10 wherein the first filtration system includes a positively charged filter medium and wherein the second filtration system includes a negatively charged filter medium.

15. The apparatus of claim 10 wherein the first filtration system includes a positively charged filter medium and wherein the second filtration system includes a neutrally charged filter medium.

16. The apparatus of claim 10 wherein the plurality of filtration systems are housed in a single container.

17. The apparatus of claim 10 wherein the plurality of filtration systems are housed in a plurality of modular containers.

18. The apparatus of claim 10 wherein said one or more components of the liquid distribution system are housed in a chassis, and each of the first filtration system and the second filtration system is located outside of the chassis so as to provide ease of access.

* * * * *